(12) United States Patent
Gercke et al.

(10) Patent No.: US 7,073,970 B2
(45) Date of Patent: Jul. 11, 2006

(54) BALL AND SOCKET JOINT

(75) Inventors: Matthias Gercke, Affinghausen (DE); Christian Maassmann, Bersenbrück (DE); Jean-Paul Castanet, Monistrol/Loire (DE); Jürgen Gräber, Stemwede-Dielingen (DE); Thomas Catterfeld, Gotha (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/473,242

(22) PCT Filed: Dec. 20, 2002

(86) PCT No.: PCT/DE02/04704

§ 371 (c)(1),
(2), (4) Date: Sep. 25, 2003

(87) PCT Pub. No.: WO03/054399

PCT Pub. Date: Jul. 3, 2003

(65) Prior Publication Data

US 2004/0105722 A1 Jun. 3, 2004

(30) Foreign Application Priority Data

Dec. 20, 2001 (DE) ................................. 101 63 147

(51) Int. Cl.
*F16C 11/00* (2006.01)
(52) U.S. Cl. ........................ 403/132; 403/133; 384/203
(58) Field of Classification Search ................ 403/122, 403/127, 132, 133, 135, 136, 140; 384/203
See application file for complete search history.

(56) References Cited

U.S. PATENT DOCUMENTS

| 2,855,232 | A | * | 10/1958 | Kozak | 403/132 |
|---|---|---|---|---|---|
| 4,564,307 | A | | 1/1986 | Ito | |
| 4,704,043 | A | | 11/1987 | Hackman et al. | |
| 5,368,408 | A | * | 11/1994 | Shimizu et al. | 403/140 |
| 6,019,541 | A | * | 2/2000 | Maughan | 403/140 |
| 6,082,923 | A | * | 7/2000 | Maughan | 403/135 |
| 6,164,861 | A | * | 12/2000 | Maughan | 403/135 |
| 6,190,080 | B1 | | 2/2001 | Lee | |
| 6,554,525 | B1 | * | 4/2003 | Heidemann et al. | 403/140 |
| 6,840,697 | B1 | * | 1/2005 | Dorr | 403/138 |

FOREIGN PATENT DOCUMENTS

| DE | 39 21 408 A1 | 1/1990 |
|---|---|---|
| DE | 43 06 006 A1 | 9/1994 |

(Continued)

*Primary Examiner*—Gary S. Hartmann
(74) *Attorney, Agent, or Firm*—McGlew & Tuttle, P.C.

(57) ABSTRACT

A ball-and-socket joint for a motor vehicle, especially for a rocker pendulum of a motor vehicle, is provided with a housing (1), which is open on at least one side and into the interior space (2) of which a bearing shell (3) is inserted, which in turn accommodates a joint ball (4) of a ball pivot (5) in a slidingly movable manner. The interior space (2) has elevations and/or depressions (7) along its inner jacket surface (6) or a polygonal cross section, so that the bearing shell (3), which is provided with an oversize in relation to the inner jacket surface (6), can be inserted into the housing (1) in a positive-locking manner while its outer surface undergoes a partial plastic deformation. The inner jacket surface (6) may have pressure zones (19) which shorten the effective length of the elevations and/or depressions (7).

14 Claims, 7 Drawing Sheets

FOREIGN PATENT DOCUMENTS

| | | |
|---|---|---|
| DE | 693 07 077 T2 | 5/1997 |
| DE | 196 38 252 A1 | 3/1998 |
| EP | 0 345 452 | 12/1989 |
| EP | 0 556 890 A1 | 8/1993 |
| GB | 1121004 | 8/1966 |
| WO | WO 01/88394 A1 | 11/2001 |

* cited by examiner

BALL AND SOCKET JOINT

FIELD OF THE INVENTION

The present invention pertains to a ball-and-socket joint for a motor vehicle, especially for a rocker pendulum of a motor vehicle, with a housing, which is open on at least one side and into the interior space of which a bearing shell is inserted, which in turn accommodates a joint ball of a ball pivot in a slidingly movable manner.

BACKGROUND OF THE INVENTION

Such a ball-and-socket joint has been known from, e.g., DE 43 06 006 A1. It has a hollow cylindrical housing, into the interior space of which a bearing shell is inserted for receiving the joint ball of a ball pivot in a slidingly movable manner. The bearing shell of the prior-art ball-and-socket joints, which have a very simple design, consists of plastic, which guarantees optimal friction conditions for the joint ball to be mounted. The bearing shell disclosed in the said document has a ring collar, which is supported on one side at the end face of the housing. On the side located opposite the ring collar, a ring collet is made in one piece with the bearing shell, and in the preassembled state the said ring collet has an axial extension and external dimensions relative to the central longitudinal axis of the bearing shell that correspond to the external dimensions of the bearing shell. During the assembly of the prior-art ball-and-socket joint, the bearing shell is inserted into the housing, so that the ring collar is supported at the end face of the housing and the ring collet can be deformed on the opposite side of the housing by means of a deformation process. An ultrasonic deformation process is proposed for the deformation of the ring collet in the cited document. After the conclusion of the ultrasonic deformation, the ring collet forms a bead on the housing, as a result of which the bearing shell is fixed at the housing.

A very essential problem in the prior-art ball-and-socket joint designs is that the bearing shell fixed on the housing by means of ultrasonic deformation does not engage in a permanently fixed connection with the housing and loosening of the bearing shell cannot therefore be ruled out over the lifetime of the ball-and-socket joint. The friction generated by the relative movements between the housing and the bearing shell leads to an increase in wear, so that the ball-and-socket joint may ultimately fail. Moreover, penetrating contaminants act as factors accelerating the failure of the joint as a consequence of the abrasion due to the increasing wear of the bearing shell.

To prevent the bearing shell from loosening and from performing, e.g., rotary movements around the central longitudinal axis of the housing, notches are currently prepared in the edge area of the housing blank after the manufacturing of the housing blank, and the material of the bearing shell, softened by the ultrasonic deformation, can later flow into the said notches at least in some sections. However, the notches, prepared in the housing according to an impression process, lead to deformations of the housing, so that the latter will have unacceptable tolerances, run-outs, conicities and/or errors in plane parallelism.

It was, furthermore, observed that the material of the softened bearing shell material sometimes flows into the notches of the housing during the ultrasonic deformation to a limited extent only. Thus, separation of the bearing shell from the housing and a resulting mobility of the bearing shell in relation to the housing cannot be ruled out with certainty even in the case of these improved designs.

SUMMARY OF THE INVENTION

The basic technical object of the present invention is to develop a ball-and-socket joint that makes it possible to reliably secure the bearing shell against movements within the housing, in addition to having a simple design.

According to the invention, a motor vehicle ball-and-socket joint is provided with a housing open on a side and having an inner jacket surface with an interior space, a bearing shell inserted in said interior and a ball pivot with a joint ball accommodated in said bearing shell in a slidingly movable manner. The interior space has shaped portions. The bearing shell is provided oversized in relation to said inner jacket surface and is inserted into said housing in a positive-locking manner with an outer surface of said bearing shell partially plastically deformed by the shaped portions.

The ball-and-socket joints have as a feature in common, a housing, which is open on at least one side and into the interior space of which a bearing shell is inserted, which in turn accommodates a joint ball of a ball pivot.

Corresponding to a first suggestion of the present invention, the shaped portions are elevations and/or depressions provided in the interior space, along its inner jacket surface. The bearing shell has, furthermore, an oversize in relation to the inner jacket surface of the housing, so that quasi a press fit is obtained. As a result, an at least partial plastic deformation of the outer surface of the bearing shell takes place. The bearing shell can be inserted into the housing in a positive-locking manner.

According to another solution of the object stated in the introduction, the interior space of the housing has a polygonal cross section, so that the bearing shell, provided with an oversize in relation to the innerjacket surface, can be inserted into the housing in a positive-locking manner while its outer surface undergoes a partial plastic deformation.

Thus, it is not only possible to manufacture the ball-and-socket joint according to the present invention in a simple manner, but the ball-and-socket joint also has, furthermore, a simple design and is therefore inexpensive and guarantees, moreover, the reliable fixing of the bearing shell within the housing.

To simplify the manufacture and to reduce the depth of manufacture, it is advantageous in the sense of the present invention to provide the elevations and/or depressions over the entire height of the housing.

Following this idea, it is proposed according to another embodiment of the present invention that the elevations and/or depressions be prepared by a deformation process in the interior space of the housing. For example, a deep-drawing process may be used as the deformation process.

In addition, it is also possible to provide the inner jacket surface with the elevations and/or depressions according to a broaching process.

The housing should have the simplest geometry possible, and it is designed as a hollow cylinder according to a variant of the present invention. Furthermore, it may be manufactured according to a cold extrusion process or by means of machining.

According to another, highly advantageous embodiment of the present invention, the bearing shell is provided on one side with an outlet opening, through which a connection pin of the ball pivot connected to the joint ball protrudes to the outside, and the bearing shell is closed on the side located opposite the outlet opening. The closed side of the bearing shell thus guarantees the sealing of the ball-and-socket joint, on the one hand, and a bearing surface is thus provided, on the other hand, and, furthermore, an additional closing cover is eliminated. The ball-and-socket joint may be sealed on the pin side in the known manner by a sealing bellows.

Besides the above-described securing of the bearing shell against a rotary movement within the housing, it is, furthermore, also necessary to fix the bearing shell in the axial direction. It is proposed for this that the bearing shell be equipped on one side with a ring collar, which is supported on a front surface of the housing after the installation of the bearing shell. The side of the bearing shell located opposite this ring collar in the axial direction preferably has a ring collet, which extends axially before the assembly and is deformed to prepare a tight connection between the bearing shell and the housing during the mounting of the ball-and-socket joint. This ring collet may be deformed by means of a suitable deformation process or a welding process after the insertion of the bearing shell into the housing. For example, the ultrasonic deformation or friction deformation may be used as the deformation process. Frictional heat, which makes possible the deformation of the local area, is generated during the friction deformation process by means of a rotating deforming tool in the area of the ring collet of the bearing shell.

To achieve an additional securing of the bearing shell in the housing and to improve the sealing in this contact area if necessary, it may, moreover, be appropriate to additionally introduce a binder, which may advantageously be an adhesive.

It may happen in ball-and-socket joints of this design that the housing still has a diameter that is too small for the mounting of the ball-and-socket joint even after the elevations and/or depressions have been formed. This may be caused by inaccuracies (dispersions) during the processing of the housing, e.g., during the cold extrusion, during the welding or during the coating. However, it is also possible that the housing may have to be subsequently adapted to variations in the dimensions of other components. It may therefore be necessary in such a housing to increase the diameter to a final diameter suitable for the mounting of the ball-and-socket joint, which is performed with an expanding tool, which is introduced into the housing at least partially through the opening provided in the housing and is subsequently expanded. During the expansion, the expanding tool presses against the inner wall of the housing, as a result of which the housing is pushed apart and widened until the diameter of the housing reaches the desired final diameter. It may happen during this expansion of the housing that the elevations and/or depressions are pressed down by the expanding tool, so that the positive-locking securing against rotation according to the present invention between the bearing shell and the housing is compromised.

To solve this problem, the ball-and-socket joint according to the present invention for a motor vehicle, especially for a rocker pendulum of a motor vehicle, has a housing that is open on at least one side and into the interior space of which a bearing shell is inserted, which in turn accommodates a joint ball of a ball pivot in a slidingly movable manner, the said interior space having elevations and/or depressions along its inner jacket surface, so that the bearing shell, provided with an oversize in relation to the inner jacket surface, is inserted into the housing in a positive-locking manner while its outer surface undergoes a partial plastic formation. The inner jacket surface has pressure zones that shorten the effective length of the elevations and/or depressions.

To widen the housing, an expanding tool according to the present invention acts on the inner jacket surface of the housing exclusively in the area of the pressure zones, so that the elevations and/or depressions formed outside the pressure zones are not pressed down during the widening of the housing and are available for the positive-locking connection to the bearing shell.

The elevations and/or depressions are formed before the widening and may be provided according to a first alternative exclusively outside the pressure zones. The effective length of the elevations and/or depressions for the positive-locking connection of the housing and the bearing shell is already shortened before the widening in this case. However, according to a second alternative, the elevations and/or depressions extend into the areas of the pressure zones before the widening. The elevations and/or depressions are especially preferably formed in this case over the entire height of the housing before the widening, which can be accomplished in an especially simple manner and therefore at low cost by means of a deep-drawing process or by means of a broaching tool. The elevations and/or depressions are depressed by the expanding tool in this case in the area of the pressure zones during the widening, so that they are lower or flatter after the widening than outside the pressure zones. The effective length of the elevations and/or depressions for the positive-locking connection of the housing and the bearing shell is also shortened hereby, because the elevations and/or depressions pressed down in the area of the pressure zones can make only a limited contribution to this positive-locking connection.

The pressure zones may be arranged in an irregular distribution over the inner jacket surface. However, the pressure zones are preferably located on annular surfaces, whose centers or central axes are located on the central longitudinal axis. The expanding tool can thus be manufactured in a simpler manner, because the contact surfaces of the expanding tool, which act on the pressure zones, are annular. Furthermore, the force acting on the housing is distributed as a result more uniformly during the widening.

It is especially advantageous for one of the annular surfaces to directly adjoin the housing opening. The consequence of this is that the contact surface of the bearing shell and the housing is reduced in the area of the opening, so that contaminants can penetrate into the contact area between the bearing shell and the housing with greater difficulty only. Based on this variant of the present invention, one of the annular surfaces is provided such that it directly adjoins both end faces if the housing is designed in the form of a hollow cylinder that is open at both end faces. Such a hollow cylinder can be manufactured in an especially simple manner according to a cold extrusion process or by machining.

The elevations and/or depressions may extend, e.g., helically or linearly and be sloped in relation to the central longitudinal axis. However, the elevations and/or depressions preferably extend linearly and in parallel to the central longitudinal axis of the housing, so that the elevations and/or depressions can be prepared with a simple broaching tool or by deep-drawing the housing body. These processes are especially inexpensive.

The ball-and-socket joint according to the present invention is assembled by first inserting the pivot pin equipped with a joint ball into the recess of the bearing shell provided for this purpose. This assembly unit, comprising the bearing shell and the ball pivot, is subsequently introduced into the interior space of the housing from one side. Since the bearing shell has an oversize in relation to the inner jacket surface of the housing, an at least partial plastic deformation of the outer surface of the bearing shell takes place during the insertion of the bearing shell into the housing, so that a press fit is quasi established, and the bearing shell is connected to the housing in a positive-locking manner. Securing against rotation is established due to this plastic deformation of the outer surface of the bearing shell already during the mounting of the ball-and-socket joint, i.e., the bearing shell is prevented from performing a rotary movement around the central longitudinal axis in relation to the housing. The central longitudinal axis of the housing and the bearing shell coincide in the mounted ball-and-socket joint and they are consequently coaxial.

The expanding tool according to the present invention has a plurality of segments that can be moved independently from one another and are arranged around the longitudinal axis of the expanding tool to form the rotationally symmetrical shape of the expanding tool. The contact surfaces for widening the housing, which are separated from each other by grooves, are provided on the outer surfaces of the segments, which said outer surfaces form the jacket surface of the expanding tool.

According to a variant, the contact surfaces are arranged on annular surfaces, and the grooves are designed as annular grooves, which preferably have a sawtooth-like profile when viewed in the direction of the longitudinal axis.

According to a variant, a through hole, which extends at least partially conically, is provided in the expanding tool along the longitudinal axis. The angle of slope of the cone is preferably 5°.

The solution according to the present invention shall be explained in greater detail below on the basis of the views in the figures based on two preferred exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the ball-and-socket joint shown in the figures for a motor vehicle comprises a housing 1, which is designed as a ring-shaped housing in this case. The housing 1 has an interior space 2, which has a circular cross section in the embodiments according to FIGS. 1 through 3 and a polygonal cross section in the view in FIG. 4.

A bearing shell 3 is inserted into the interior space 2 of the housing 1. The bearing shell 3 consists of plastic and is used to receive and mount the joint ball 4 of a ball pivot designated as a whole by 5 in a slidingly movable manner. The joint ball 4 is joined by a connection pin 9 of the ball pivot 5, which is provided with a connection thread 15 for connection to a motor vehicle component, as is apparent from FIG. 2.

Figure 2:
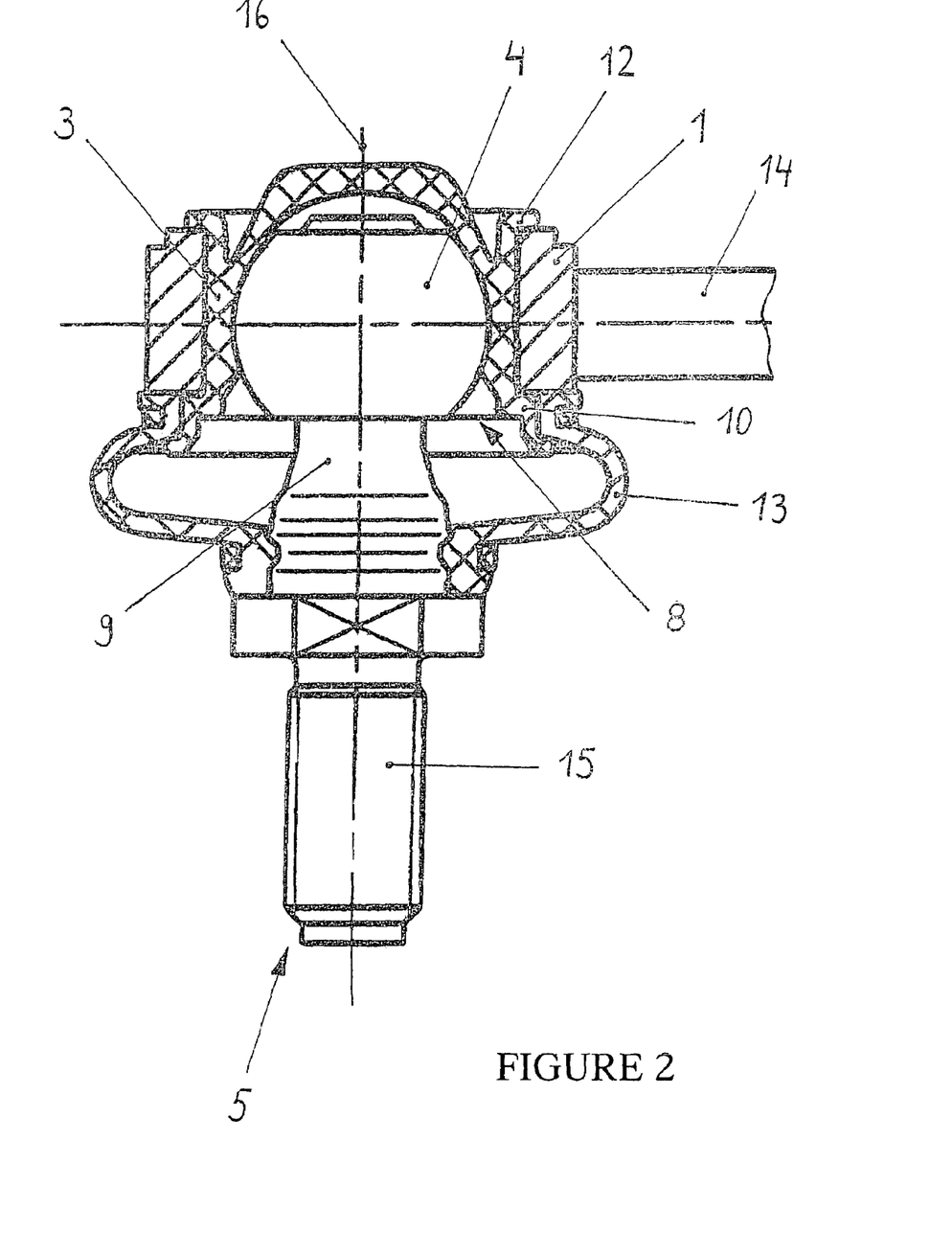
FIG. 2 is a sectional view of a mounted ball-and-socket joint according to the present invention.

Moreover, FIG. 2 shows that a shaft 14 is fastened to the housing 1. This shaft 14 was made in one piece with the housing 1 in the example.

The interior space 2 of the housing 1 has an inner jacket surface 6, which is provided with elevations and/or depressions distributed over its circumference. A ball-and-socket joint according to the present invention is manufactured by first inserting the joint ball 4 of the ball pivot 5 into the bearing shell 3, as is apparent from FIG. 1. The bearing shell 3 is now introduced into the interior space 2 of the housing from one side of the housing 1. Since the bearing shell has an oversize according to the present invention in relation to the interior space 2, the connection between the bearing shell 3 and the housing 1 can be achieved by means of a press fit only, so that the outer jacket surface of the bearing shell 3 is plastically deformed at least in some areas while it is being introduced into the housing 1.

Figure 1:
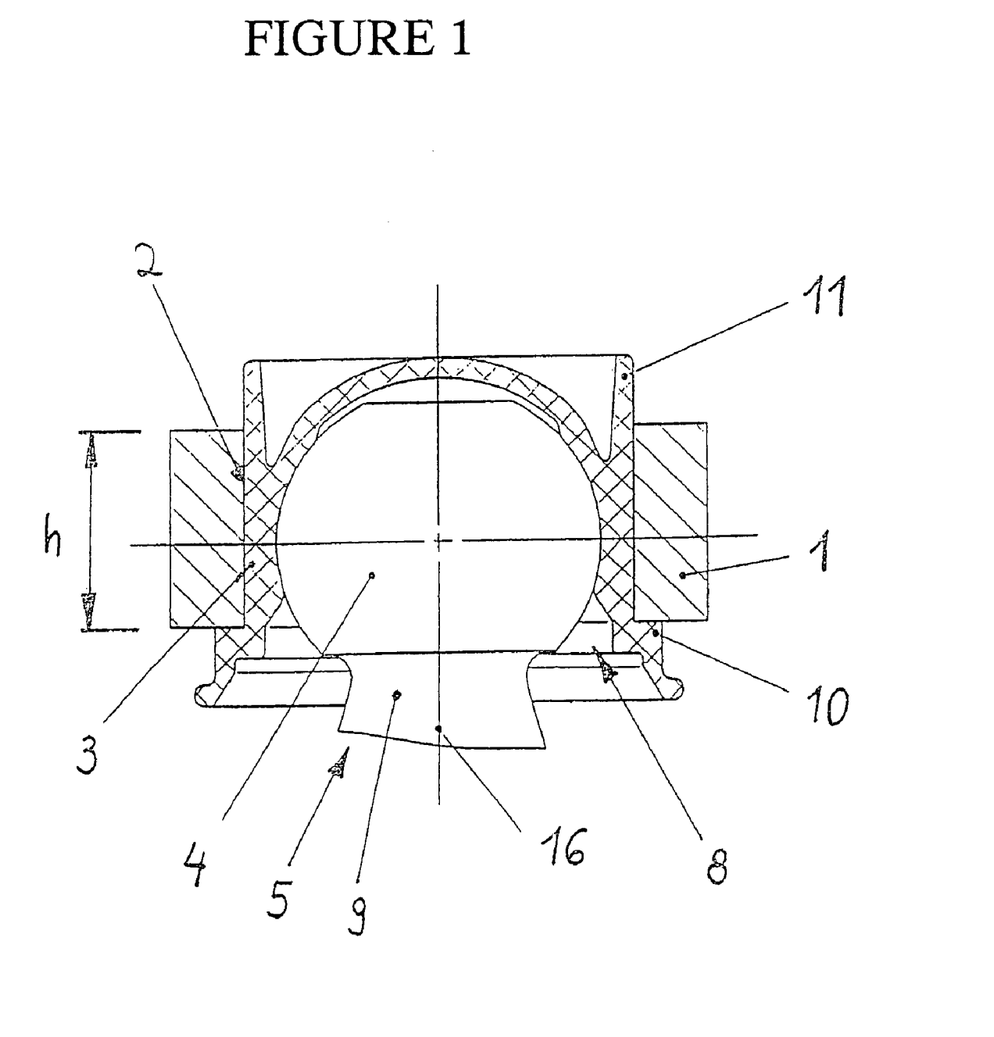
FIG. 1 is a detail and a sectional view of a ball-and-socket joint according to the present invention in the preassembled state.

The bearing shell 3 has a ring collar 10, which is supported on one side against a front surface of the housing 1. On the side located opposite the ring collar 10, the bearing shell 3 is equipped with a ring collet 11, which is shown in FIG. 1 in the yet incompletely mounted state. This ring collet 11 is deformed by means of an ultrasonic sonotrode to complete the connection between the bearing shell 3 and the housing 1 and then forms a material bead 12, as is shown in FIG. 2. Axial fixation of the bearing shell 3 is thus achieved within the housing 1 by means of the ring collar 10 and the ring collet 11 deformed into a material bead 12. The bearing shell 3 is secured against rotary movement around the central longitudinal axis 16 by the elevations and/or depressions 7 on the inner jacket surface 6 of the housing 1.

As is apparent especially clearly from FIG. 2, the bearing shell 3 is closed on one side. The need for an additional cover element for closing the ball-and-socket joint can thus be eliminated. Furthermore, the closed side of the bearing shell 3 forms an additional bearing surface for the joint ball 4 of the ball pivot 5. The joint ball 4 was manufactured as a separate component in the embodiment according to FIG. 2 and is connected to the connection pin 9. The two components together form the ball pivot 5, which has the connection thread 15 at its end. The connection pin 9 protrudes from the bearing shell 3 through an outlet opening 8 of the bearing shell 3. In the area of the ring collar 10 of the bearing shell 3, the bearing shell has a groove on the outside for receiving a sealing bellows 13. The other end of the sealing bellows 13 is sealingly in contact with the connection pin 9 of the ball pivot 5.

Figure 3:
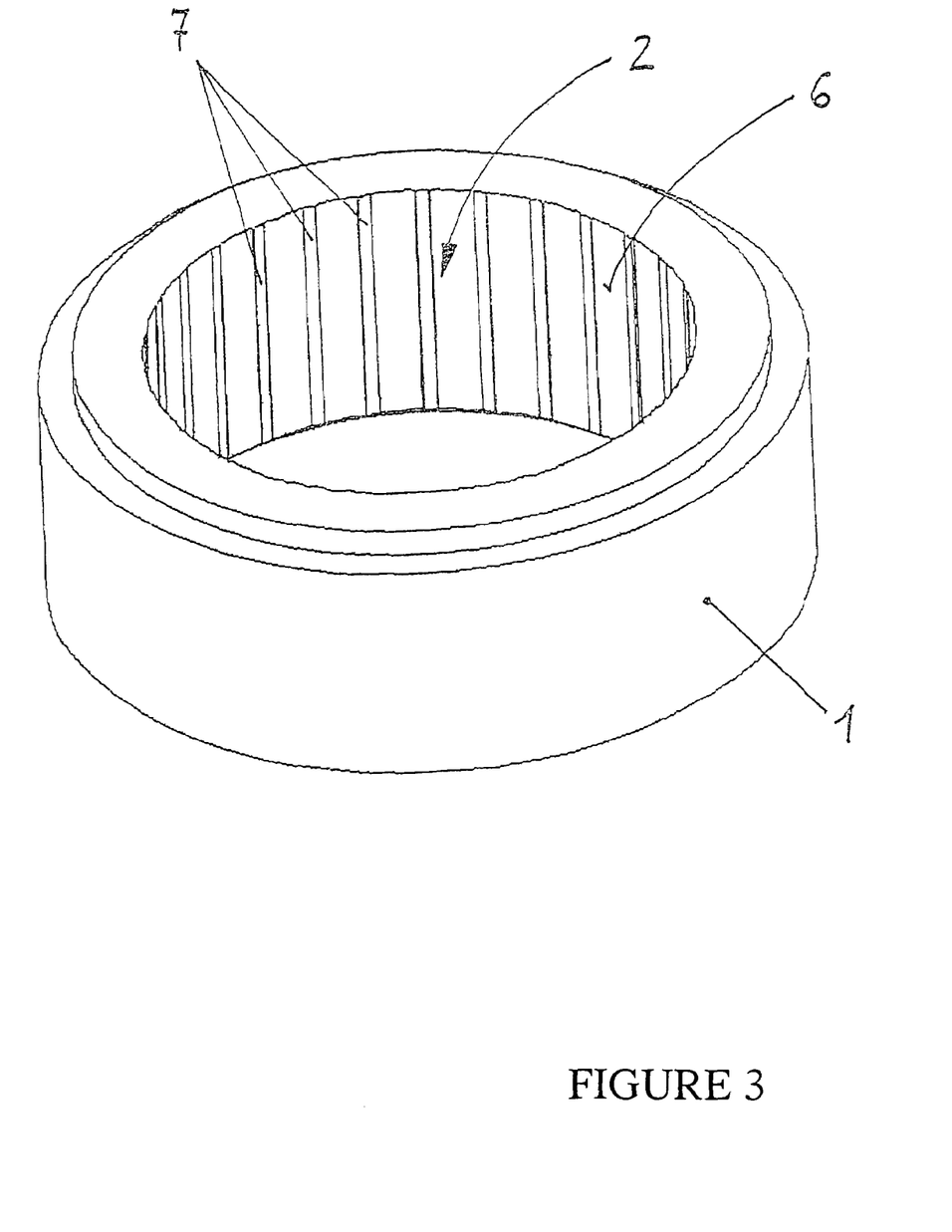
FIG. 3 is a three-dimensional view of a housing as an individual part.

To simplify the manufacture of a housing as is shown as an example as an individual part in FIG. 3, the said housing is manufactured as a cold extruded part. It is provided with an inner jacket surface 6, in which elevations and/or depressions 7 are prepared. The elevations/depressions 7 were prepared by means of a broaching tool in one operation. The interior space 2 of the housing 1 thus formed is used to subsequently receive the bearing shell 3 in the above-described manner.

Figure 4:
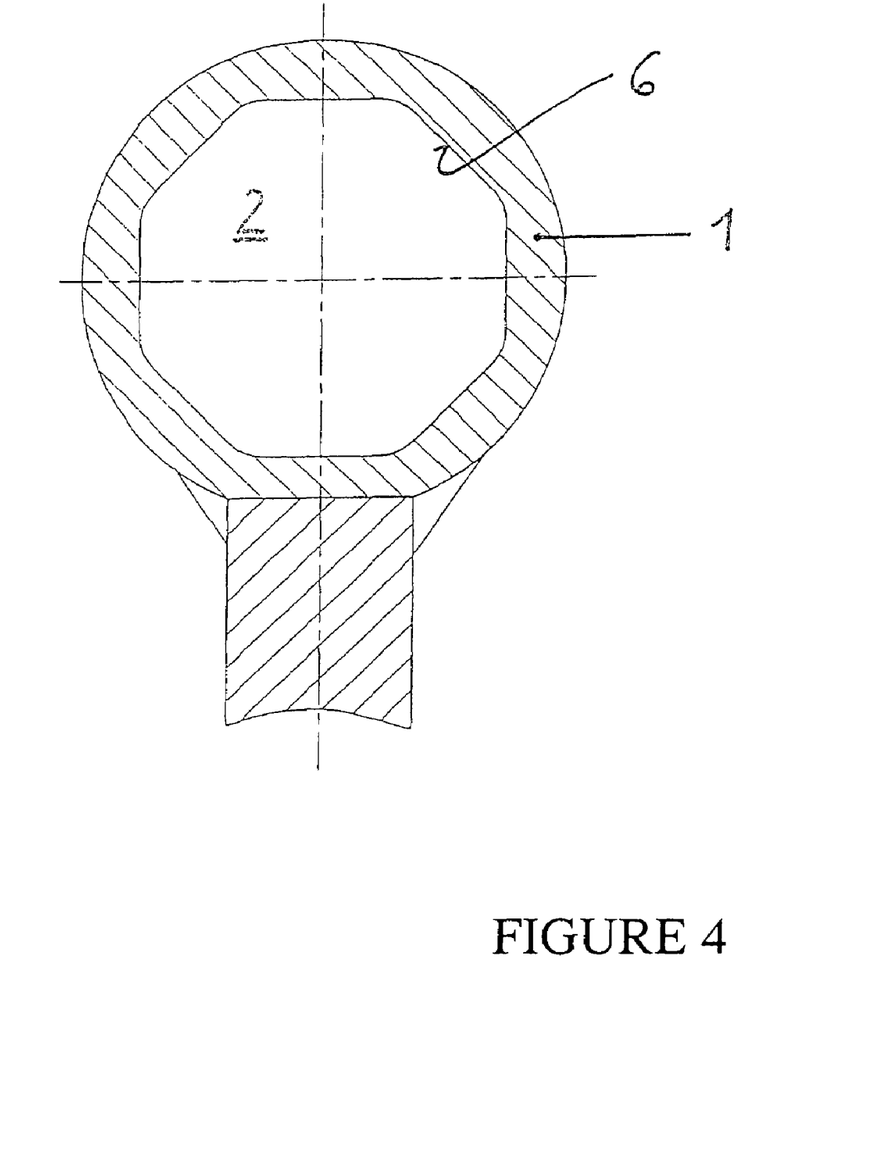
FIG. 4 is a sectional view of another housing for a ball-and-socket joint according to the present invention.

Another possible embodiment of a housing 1 for a ball-and-socket joint according to the present invention is shown in FIG. 4. The housing 1 has an outer jacket surface of a circular cross section here, while the inner jacket surface 6 of the housing 1 has a polygonal cross section. The interior space 2 of this housing, which has thus been formed, is likewise connected to the bearing shell 3 by plastic deformation, so that securing of the bearing shell against rotary movement around the central longitudinal axis 16 is hereby guaranteed.

Figure 5:
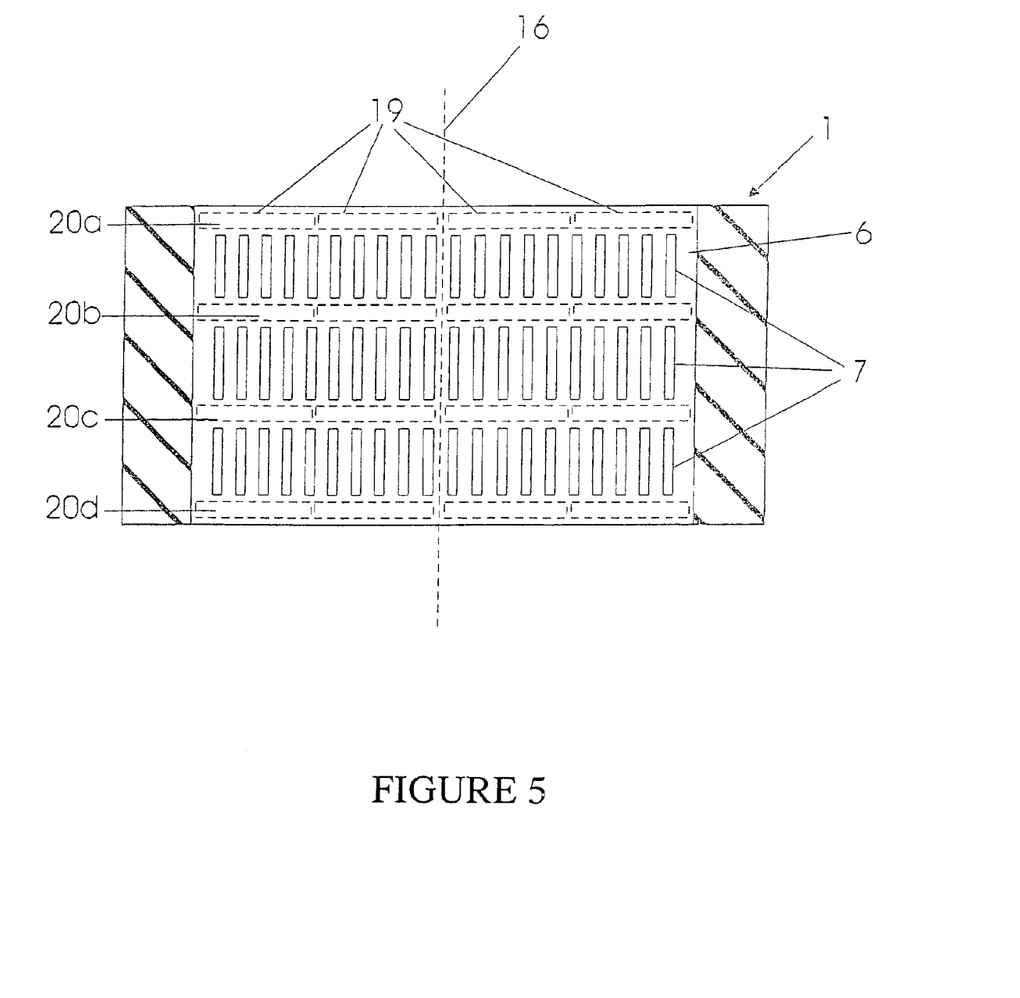
FIG. 5 is a sectional view of the housing according to FIG. 3 after the widening.

The elevations/depressions 7 are formed at first over the entire height h of the housing 1 (see FIG. 3), which is subsequently widened in a deformation step to the diameter necessary for mounting the ball-and-socket joint. An expanding tool 17 (see FIGS. 6 through 8), which acts with contact surfaces 18 locally on the inner jacket surface 6 of the housing 1, is used for this widening. The elevations/depressions 7 are pressed down in the area of the contact surfaces 18 during the widening, so that pressure zones 19 (see FIG. 5) are formed, in which the elevations and/or depressions 7 are either completely destroyed or have been made at least lower or flatter after the widening. The pressure zones 19 are located on four annular surfaces 20a, 20b, 20c and 20d, whose center or central axis is located on the central longitudinal axis 16 of the housing, and the annular surfaces 20a and 20d directly adjoining the end faces of the housing 1, in particular, contribute to a reduction of the amount of contaminants that can penetrate into the contact space between the housing 1 and the bearing shell 3 via the end faces.

Figure 6:
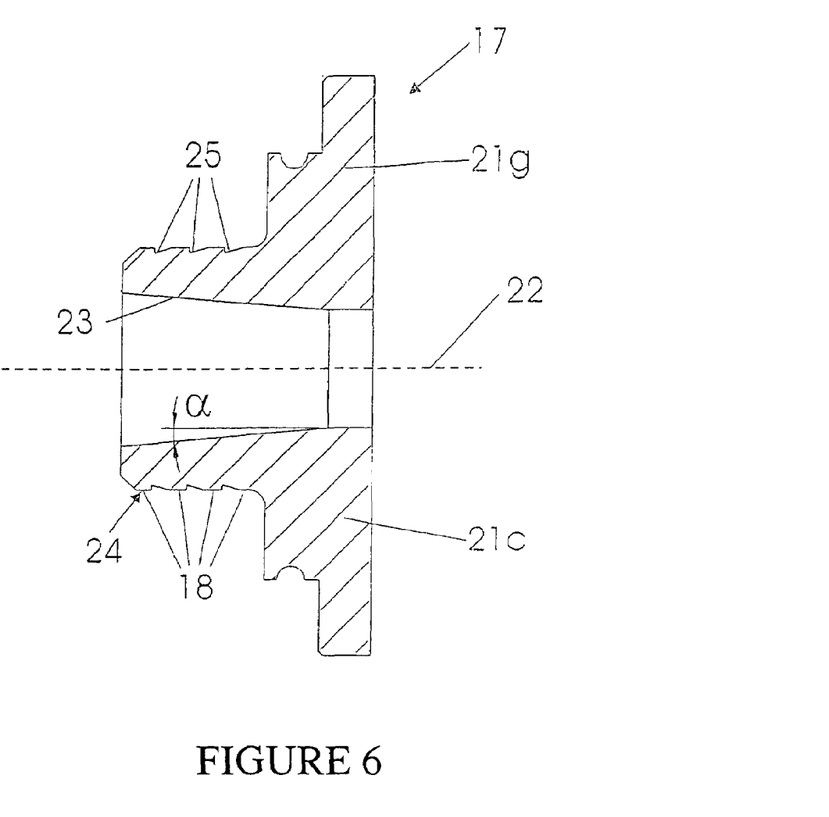
FIG. 6 is a sectional view of an embodiment of the expanding tool according to the present invention for widening the housing.
Figure 7:
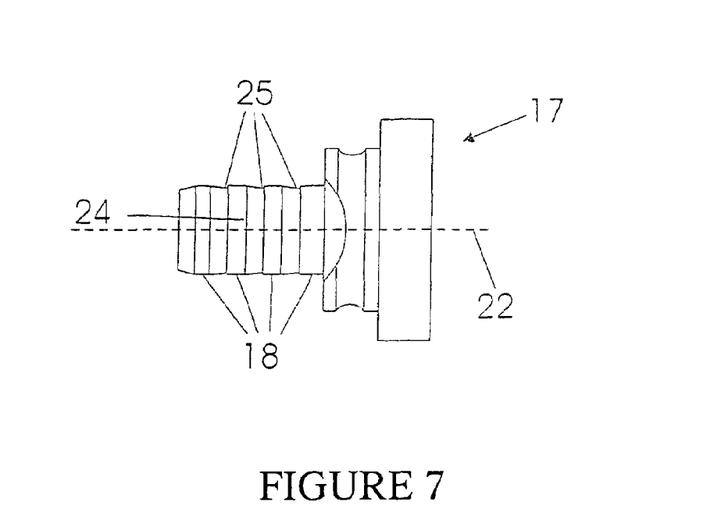
FIG. 7 is a side view of the embodiment according to FIG. 6.
Figure 8:
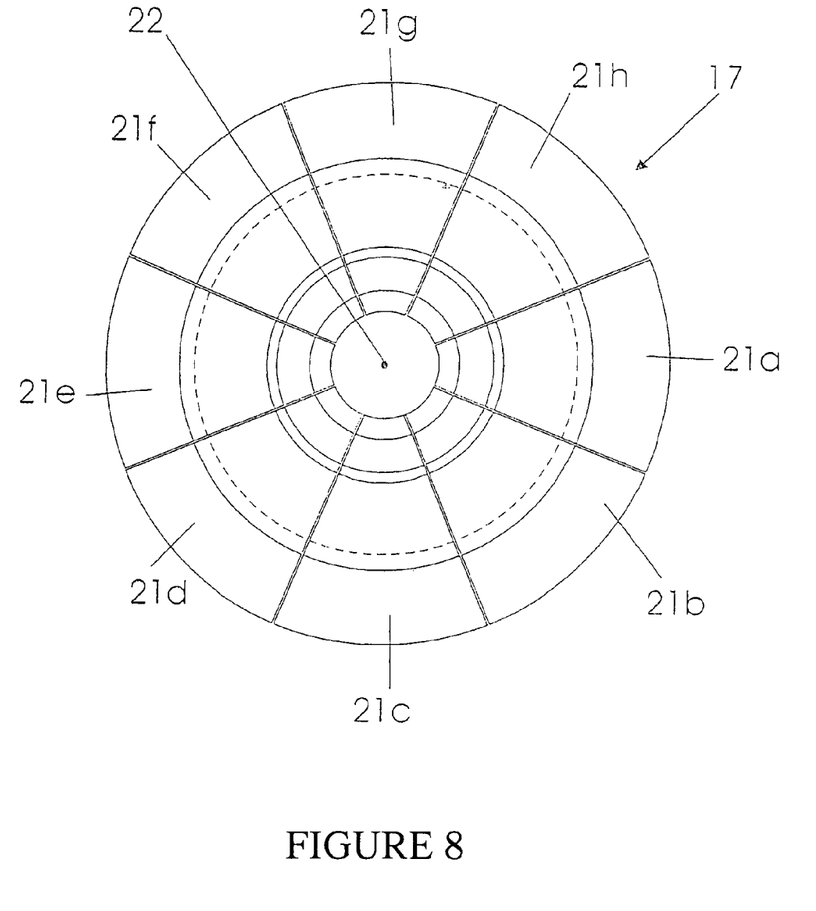
FIG. 8 is a top view of the embodiment according to FIG. 6.

FIGS. 6 through 8 show different views of an embodiment of the expanding tool 17 according to the present invention. The expanding tool has separate segments 21a through 21h, which can be moved radially in the outward direction in relation to the longitudinal axis 22 of the expanding tool 17. This movement is generated such that a bolt (not shown) is pushed or pulled through a cone 23, which is provided in the expanding tool 17 and whose smallest diameter is smaller than the greatest diameter of the said bolt. The bolt may have, e.g., the shape of a cylinder or a truncated cone.

To widen the housing 1, the expanding tool 17 is inserted into the housing 1, after which the bolt is pushed or pulled through the cone 23. The separate segments 21a through 21h, which will subsequently move in the radially outward direction, will then press the inner jacket surface 6 of the housing 1 such that the said housing will be expanded. The diameter to which the housing 1 will be expanded can be set by the dimensions of the expanding tool 17, especially the angle of slope α of the cone 23 and the diameter of the bolt.

The outer surface 24 of the expanding tool 17 or of the segments 21a through 21h, which presses the inner jacket surface 6 during the widening, has a plurality of annular grooves 25, which are arranged at spaced locations from one another and whose center is located on the longitudinal axis 22. The contact surfaces 18, which press the inner jacket surface 6 of the housing 1 during the widening and thus form the pressure zones 19, are located between the sawtooth-like annular grooves 25. The uniformity with which the housing 1 can be widened increases with an increasing number of contact surfaces 18 present, but the elevations/depressions 7 available for the positive-locking connection between the bearing shell 3 and the housing 1 after the widening will also be less effective as the number of contact surfaces 18 increases. Four contact surfaces 18 with three annular grooves 25 are provided according to the embodiment that represents a good compromise for the application. The annular grooves 25, which are sawtooth-shaped according to this embodiment, additionally ensure that the sawtooth shape is reproduced with the sharpest possible edges at least partially on the inner jacket surface 6, so that the forces needed for pulling out the bearing shell 3 are increased after the bearing shell 3 has been inserted into the housing 1, similarly to what happens in the case of a barb.

While specific embodiments of the invention have been shown and described in detail to illustrate the application of the principles of the invention, it will be understood that the invention may be embodied otherwise without departing from such principles.

The invention claimed is:

1. A ball-and-socket joint for a rocker pendulum of a motor vehicle, the ball-and-socket joint comprising:
   a housing, which is open on at least one side and has an inner jacket surface with an interior space;
   a bearing shell inserted in said interior;
   a joint ball of a ball pivot accommodated in said bearing shell in a slidingly movable manner, said interior space having elevations and/or depressions along said inner jacket surface, said bearing shell being provided with an oversize in relation to said inner jacket surface and being inserted into said housing in a positive-locking manner with an outer surface of said bearing shell undergoing a partial plastic deformation, wherein said inner jacket surface has pressure zones located on at least two annular surfaces, which are arranged at spaced locations from one another and whose centers or central axes are located on a central longitudinal axis of said housing, said pressure zones shortening the effective length of said elevations and/or depressions.

2. A ball-and-socket joint in accordance with claim 1, wherein said elevations and/or depressions extend over the entire height of said housing.

3. A ball-and-socket joint in accordance with claim 1, wherein said elevations and/or depressions are prepared as deformed portions according to a deformation process.

4. A ball-and-socket joint in accordance with claim 1, wherein said housing has a hollow cylindrical shape.

5. A ball-and-socket joint in accordance with claim 1, wherein said housing is prepared to a cold extruded finish or a machining finish according to a cold extrusion process or by a machining means.

6. A ball-and-socket joint in accordance with claim 1, wherein said bearing shell has on one side an outlet opening, through which a connection pin of said ball pivot, which said connection pin is connected to said joint ball, protrudes to the outside, and said bearing shell is closed on the side located opposite said outlet opening.

7. A ball-and-socket joint in accordance with claim 1, wherein said bearing shell has on one side a ring collar, which is supported on a front surface of said housing after the installation of said bearing shell, and the side of said bearing shell, which said side is located opposite said ring collar in the axial direction, has a ring collet, which extends axially before the mounting and is deformed to establish a tight connection between said bearing shell and said housing.

8. A ball-and-socket joint in accordance with claim 7, wherein said ring collet is deformed to a welded finish or a rolling finish by a deformation means utilizing a welding process or a rolling process.

9. A ball-and-socket joint in accordance with claim 1, wherein a binder or an adhesive, is introduced between said bearing shell and said housing.

10. A ball-and-socket joint in accordance with claim 1, wherein one of said annular surfaces directly adjoins the at least one said housing opening.

11. A ball-and-socket joint in accordance with claim 1, wherein said housing has a hollow cylindrical shape open at both end faces, and one of the annular surfaces each directly adjoins each of said two housing openings.

12. A ball-and-socket joint in accordance with claim 1, wherein said elevations and/or depressions extend in parallel to said central longitudinal axis of said housing.

13. A ball-and-socket joint in accordance with claim 1, wherein sawtooth-like structures, by which the force necessary for pulling said bearing shell out of said housing is increased, are formed on said inner jacket surface.

14. A ball and socket joint according to claim 1, wherein said elevations and/or depressions extend in an axial direction of said housing and said elevations and/or depressions are axially interrupted by a pressure zone.

* * * * *